United States Patent [19]
Schindler et al.

[11] Patent Number: 5,715,383
[45] Date of Patent: Feb. 3, 1998

[54] COMPOUND DEPTH IMAGE DISPLAY SYSTEM

[75] Inventors: Roland R. Schindler; Douglas Val Ziegler, both of Rochester, N.Y.

[73] Assignee: Eastman Kodak Company, Rochester, N.Y.

[21] Appl. No.: 951,261

[22] Filed: Sep. 28, 1992

[51] Int. Cl.$^6$ ............................................. G09G 3/36
[52] U.S. Cl. ................................... 395/119; 348/40
[58] Field of Search ............................. 395/155, 161, 395/119; 359/462, 463, 464, 619; 348/40, 42, 47, 48, 51, 52, 559, 563

[56] References Cited

U.S. PATENT DOCUMENTS

| | | |
|---|---|---|
| 2,815,310 | 12/1957 | Anderson. |
| 3,154,872 | 11/1964 | Nordgren. |
| 3,562,941 | 2/1971 | Boden ............................ 40/106.53 |
| 3,692,312 | 9/1972 | Meyer ............................ 359/559 X |
| 3,704,068 | 11/1972 | Waly ............................... 355/46 X |
| 3,772,976 | 11/1973 | Stroke ................................ 354/77 |
| 3,907,420 | 9/1975 | Yevich ........................... 359/619 X |
| 3,922,074 | 11/1975 | Ikegami et al. .............. 359/619 X |
| 4,062,045 | 12/1977 | Iwane ................................ 348/48 |
| 4,092,654 | 5/1978 | Alasia ............................ 354/112 X |
| 4,094,596 | 6/1978 | Waly ................................. 353/120 |
| 4,135,502 | 1/1979 | Peck .............................. 351/203 X |
| 4,305,095 | 12/1981 | Dallas ................................ 348/42 |
| 4,346,962 | 8/1982 | Holmes, Jr. ................... 359/463 X |
| 4,562,463 | 12/1985 | Lipton ............................. 348/56 X |
| 4,677,481 | 6/1987 | Nicholas ....................... 348/184 X |
| 4,709,263 | 11/1987 | Brumage ........................ 348/42 X |
| 4,740,073 | 4/1988 | Meacham ............................ 352/58 |
| 4,754,327 | 6/1988 | Lippert .............................. 348/50 |
| 4,807,965 | 2/1989 | Garakani ........................... 359/464 |
| 4,841,292 | 6/1989 | Zeno .............................. 345/121 X |
| 4,853,769 | 8/1989 | Kollin ................................ 348/54 |
| 4,896,210 | 1/1990 | Brokenshire et al. ........... 348/51 X |
| 4,920,039 | 4/1990 | Fotland et al. ................. 430/324 X |
| 4,935,335 | 6/1990 | Fotland .......................... 430/324 X |
| 4,944,572 | 7/1990 | Young ............................ 359/619 X |
| 4,956,705 | 9/1990 | Wright ................................ 348/50 |
| 4,965,665 | 10/1990 | Amir ................................ 348/126 |
| 4,987,487 | 1/1991 | Ichinose et al. ..................... 348/59 |
| 4,999,006 | 3/1991 | Hamanaka ..................... 359/559 X |
| 5,014,126 | 5/1991 | Pritchard et al. ................... 348/42 |
| 5,049,987 | 9/1991 | Hoppenstein ....................... 348/48 |
| 5,067,167 | 11/1991 | Berger ............................ 395/117 X |
| 5,083,199 | 1/1992 | Börner ............................. 348/59 X |
| 5,099,320 | 3/1992 | Allio ............................... 348/59 X |
| 5,101,268 | 3/1992 | Ohba .............................. 348/43 X |
| 5,101,442 | 3/1992 | Amir ............................... 382/41 X |
| 5,113,213 | 5/1992 | Sandor et al. ...................... 355/22 |

FOREIGN PATENT DOCUMENTS

| | | |
|---|---|---|
| 2279133 | 2/1976 | France. |
| 2 521 379 | 8/1983 | France. |
| 2 573 87 | 11/1984 | France. |
| 3512374 | 9/1985 | Germany. |
| 8529297 | 12/1987 | Germany. |
| 1531064 | 1/1986 | U.S.S.R. |
| 9008343 | 7/1990 | WIPO. |

OTHER PUBLICATIONS

Cracker Jack (Nickelodeon®), pp. 1–3.

*Primary Examiner*—Phu K. Nguyen
*Assistant Examiner*—Cliff N. Vo
*Attorney, Agent, or Firm*—Gordon M. Stewart

[57] ABSTRACT

A system and method that captures depth images of different content documents or scenes to be provided in a compound document. The viewpoints for the captured depth images are used to adjust the positioning of the images on a planar image recording substrate, so that different content depth or three-dimensional images will be viewed from different angles of the single document when the substrate is viewed through a depth image display device. The images are printed on the planar substrate and the screen is attached producing the desired compound document.

7 Claims, 4 Drawing Sheets

COMPOUND DEPTH IMAGE DISPLAY SYSTEM

CROSS REFERENCES TO RELATED APPLICATIONS

This application is related to U.S. application entitled Electronically Interpolated Integral Photography System having U.S. Ser. No. 07/722,713 and Kodak Docket No. 61,496, U.S. application entitled Method and Apparatus For Optimizing Depth Images By Adjusting Print Spacing having U.S. Ser. No. 07/885,705 and Kodak Docket No. 62,228, and U.S. application entitled Electronically Printed Depth Photography System With Improved Viewing Range having U.S. Ser. No. 07/885,699, Kodak Docket No. 64,374 all incorporated by reference herein.

BACKGROUND OF THE INVENTION

1. Field of the Invention

The present invention is directed to the production of compound document displays where a different viewing angle of the compound document allows the viewer to perceive a different document where the documents can be depth or three-dimensional images and where the substrate on which the images are formed is planar.

2. Description of the Related Art

The publication of compound documents is a very common phenomenon in the world today. By compound documents, we are referring to documents that contain or have content or various combinations of text, graphics, speech, and images. Additionally, the text may be in multiple languages. Compound documents are found in publications such as books, menus (especially those in Chinese, Japanese and Korean restaurants in the United States), advertisements, signs, dictionaries, language teaching materials, magazines (most notably the multilingual multimedia ones published by airlines), sports trading cards, business cards, and identification badges.

One of the major problems associated with the publication of multilingual documents, in particular, is that of the amount of space taken up, resulting in documents than are much longer than monolingual documents, thus requiring much more paper.

A rather unique problem faces Japanese publishers—both typography-based as well as computer-based. This is the issue of *Hiragana* or *Rubi*. In Japanese, most Chinese characters (Kanji) used in the language have multiple pronunciations or readings. Some characters are even so rarely used that many people do not know the pronunciation of the characters. The solution used by publishers up to now is a very expensive one, that of printing in very small type (similar to subscript or superscript in relative size) alongside (if the printing is in the traditional vertical mode) or above (if the printing is in the more modern horizontal mode) the pronunciation of the characters is question. This is difficult because of the added expense of having to print a significant amount of additional text, plus the mechanical problems of lining up characters with their pronunciations, etc.

What is needed is a multi-dimensional document where different views of the document provide different content types (text, graphics, speech, images) or in different languages (for text and speech).

SUMMARY OF THE INVENTION

It is an object of the present invention to provide a single display with multiple views each view presenting a different content display.

It is another object of the present invention to provide depth or three-dimensional images within a compound multiple view document.

It is also an object of the present invention to provide a compound multiview document that uses a flat substrate for imprinting the document.

It is another object of the present invention to allow multiple views of an object, such as front back and top, in the same document.

It is an object of the present invention to allow the same document to separately show different products from the same display space.

The above objects can be attained by a system and method that captures depth images of different content documents or scenes to be provided in a compound document. The view point of the captured depth images is used to adjust the positioning of the images on an image recording substrate, so that different content depth or three-dimensional images will be viewed from different angles of the single document when the substrate is viewed through a lenticular screen. The images are printed on the planar substrate and the lenticular screen is attached producing the desired compound document.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
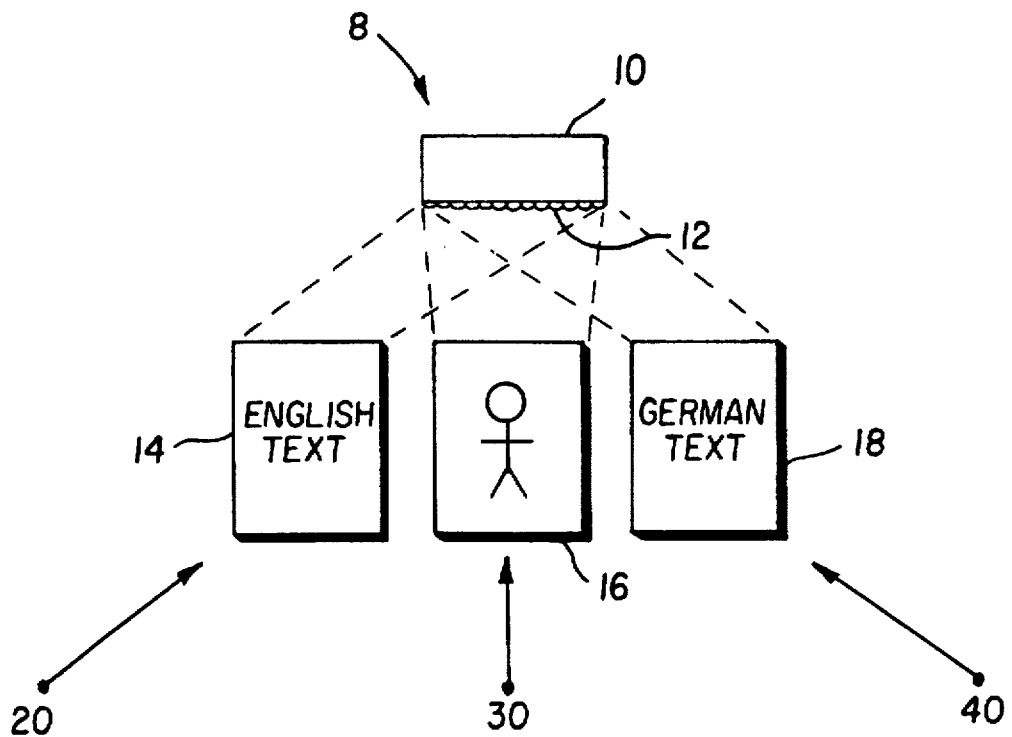
FIG. 1 illustrates different content displays provided from different view points of a compound multiview document according to the present invention.

A compound document 8, in accordance with the present invention, as illustrated in FIG. 1, comprises a flat substrate 10 on which lenticular images of different content displays are formed and viewed through depth image projection device such as a lenticular screen 12 attached to the substrate 10. The substrate 10 can be a film negative or print type substrate or a volatile substrate such as a television screen while a barrier or integral screen can be substituted for the lenticular screen since they are also depth image projection devices. The substrate 10 and screen 12 can be integrally related such that a radiation sensitive emulsion is on one side and the screen on the other or the screen could be part of the glass of a television picture tube. When the compound document 8 is viewed from the different view points 20, 30 and 40 the viewer sees a different content display. For example, a viewer viewing the document from the view point 20 at the particular angle of view point 20 sees for example english text describing the depth or three-dimensional image 16 which is seen from view point 30. While from view point 40 the corresponding text describing the image 16 is seen in German. The apparent position of the different content displays because the displays are depth or three-dimensional images can be controlled by designating the position of the capture window. For example, the English and German text could be made to appear as if it was positioned at the surface of the document 8, while the figure display 16 could be arranged so that the figure appears behind or deep within the document 8 or appears floating in front of the document. Of course the text could also be made to appear to float in front of or behind the document. The displays 14, 16 and 18 can be depth images that provide the view with a three dimensional view of the text or figure, that is, a sense of depth with a "look-around" capability. That is, the text would look as if it was made of three dimensional object that would have different characteristics depending upon the angle of view around the preferred view point. Compound documents such as illustrated in FIG. 1 are useful for displays where different types of information about the same subject matter are presented. For example, restaurant menus with text in different languages and a three dimensional image of the menu item or food would be very helpful in international restaurants. Details concerning how such a document is created will be described in more detail later herein.

Figure 2:
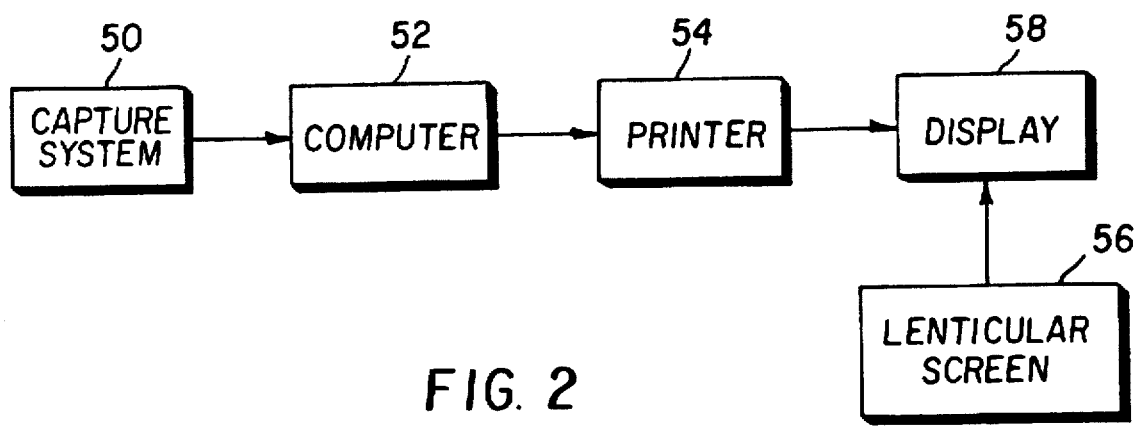
FIG. 2 depicts components of a system for producing a compound document as illustrated in FIG. 1.

FIG. 2 illustrates the components of a system in accordance with the present invention which is used to create compound documents as illustrated in FIG. 1. A capture system 50 such as an electronic camera or a film camera with a film to digital image converter captures the depth images of the various documents or scenes which are to be combined into the compound document. The capturing and digitization of such depth images is described in more detail in the related applications previously mentioned. Once the images are captured a computer 52 is used to arrange the scan lines of the depth images in an order which will produce the display of FIG. 1 when viewed through a lenticular screen. This arrangement will be discussed in more detail with respect to FIGS. 3, 4 and 5. The computer 52 outputs the images to a printer 54 which can be a film printer or a thermal printer or some other type of printer capable of producing scanned printed images. Of course the output could be to the CRT of a television. The output of the printer 54 is combined with a lenticular screen 56 to produce the compound document multiview display 58.

Figure 3:
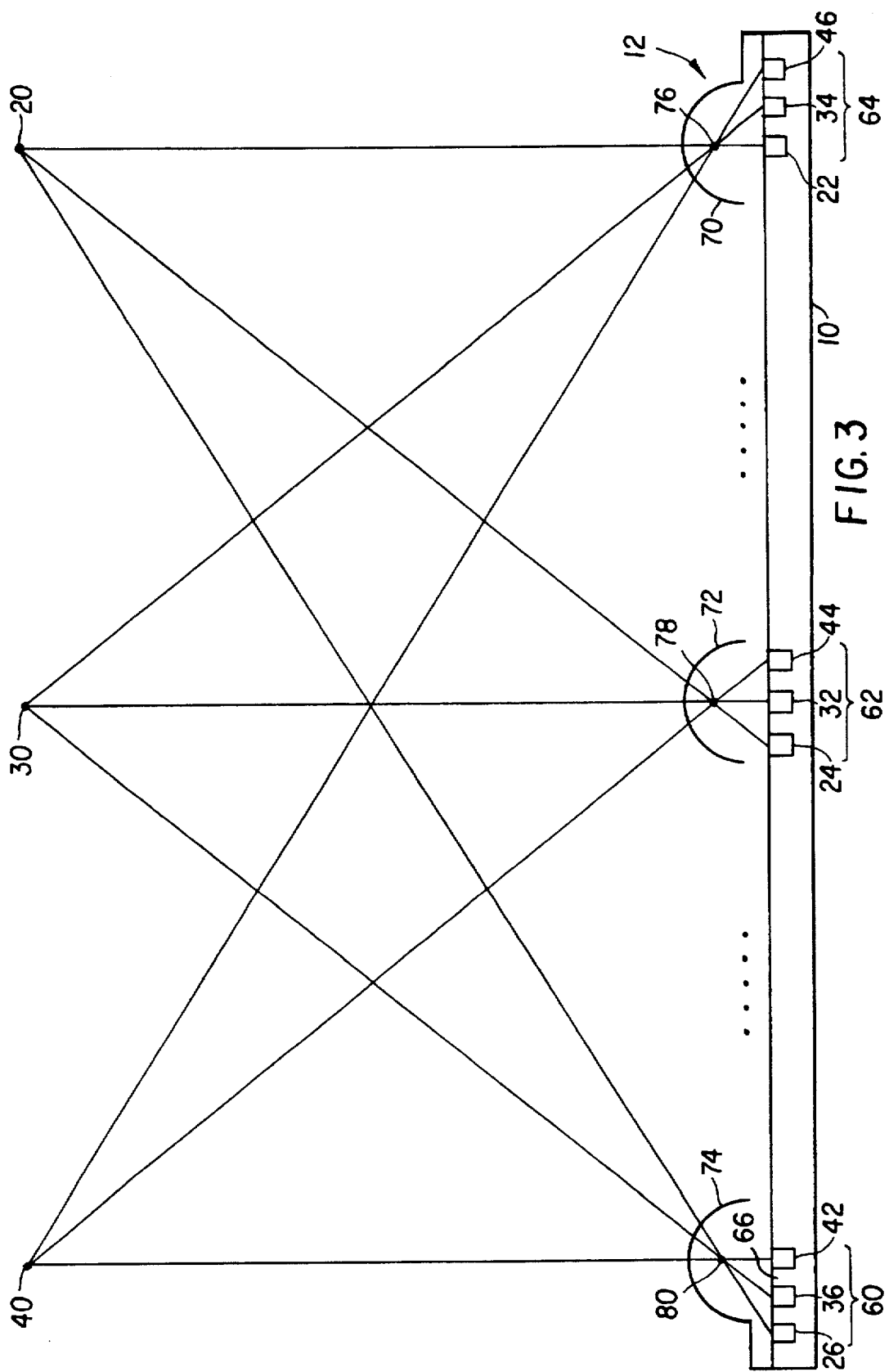
FIG. 3 depicts image groupings with respect to view points and a lenticular screen producing the displays of the multiview compound document of FIG. 1.

To provide a depth image a slightly different image of the same content from a different perspective must be presented to each eye of the viewer and when the viewer changes position within the range of view points suitable for viewing the particular depth image. Additional information concerning how depth images are created and recorded can be found in the related applications previously mentioned and the theory behind depth or three dimensional images can be obtained from Three-Dimensional Imaging Techniques, Okoshi, Academic Press, New York, 1976. The images that correspond to a particular content and thus to a particular view point are called a content group. Within this content group each of the lenticular image scan lines presents to the viewer a different slice or portion of a view of the same content, thereby allowing depth to be perceived. The groups that correspond to a particular lenticule are called a lenticular set and FIG. 3 shows three sets 60, 62 and 64. For example, in FIG. 3 from view point 20 the depth image perceived is composed of groups of scan line images 22, 24 and 26 associated with different lenticules 70, 72 and 74 and projected to the viewer by the lenticular screen. Of importance to note is that the position of the group of content images is different for each lenticule with respect to what could be called the optical axis 76, 78 and 80 of each lenticule. For example, the content group 22 from view point 20 is arranged directly under the optical axis 76 of lenticule 70 while the content group 26 for lenticule 74 is displaced to the left with respect to the optical axis 80 of that lenticule 74. The same principle happens with respect to view point 30 except that the displacement instead of moving in a single direction as occurs with respect to view point 20 moves in both directions on both sides of the center of the display. For example, the content group 36 for view point 30 is displaced to the left of the optical axis 80 of the lenticule 74 while the content group 34 is displaced to the right of the optical axis 76 of lenticule 70. As can be seen from the illustration in FIG. 3 the image content group for each view point is displaced differently depending on the location of the view point and the relative location of the lenticule projecting its slice of the view to the view point. The spacing between lenticular sets or displacement of the center of each set with respect to the corresponding optical axis also varies across the substrate where the spacing or displacement increases as the projecting lenticule moves out from the center of the document 8. That is, not only must the intergroup spacing or displacement be adjusted to account for the viewpoint but the interlenticule set spacing or displacement must also account for the different viewpoints. With a typical lenticular screen having 53 lenticules per inch it is possible to create 24 separate scan line images which correspond to a particular lenticule. That is, 24 different images can be presented to the viewer depending upon the view point of the viewer. In such a situation each lenticule would project a different scan line or image slice to a different view point and the viewers eye/brain integrates all the slices into a single picture or image. When a depth images is desired, at least two images must be used to provide a different perspective for each eye when viewing the content from that particular view point. As a result, it is possible to have 12 different view points providing 12 depth images in a compound document for the typical lenticular screen. However, a much higher quality depth image is provided when at least four different images are used to create each content group, thereby allowing up to six view points from which a depth image can be provided over a small range of viewing angle. To provide even higher quality image content, viewable over a larger viewing range the content document preferably has three view points allowing eight different images to be perceived from a range around a particular view point thereby providing a much better sense of depth for each of the depth images. The spacing or changes in displacement of the groups and sets of images can be accomplished in accordance with the procedures described in more detail in the related applications previously mentioned.

Figure 4:
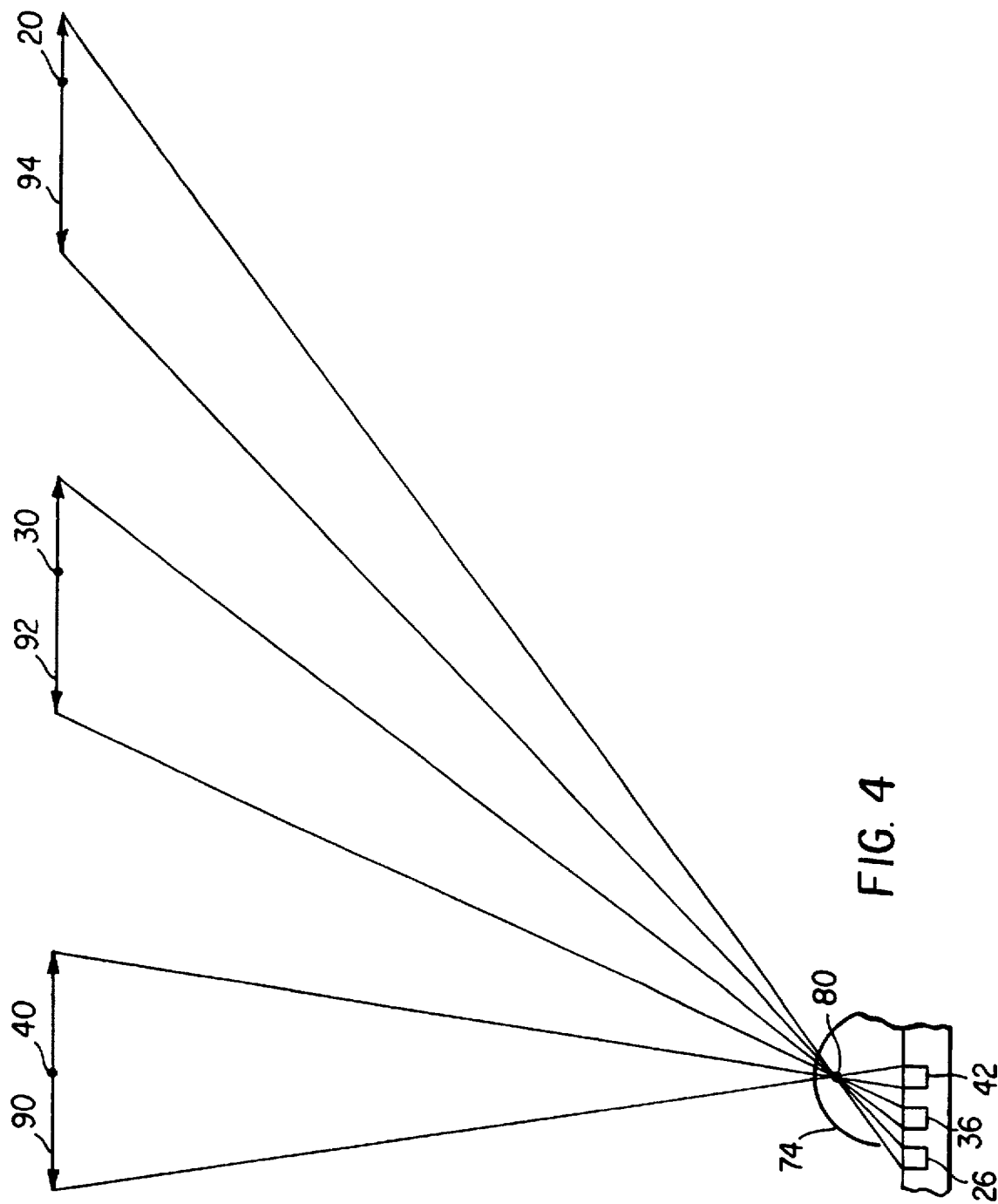
FIG. 4 illustrates view ranges for each group of images provided by a lenticule.

FIG. 4 illustrates the viewing ranges for the content groups associated with lenticule 74 of FIG. 3. As can be seen the scan lines on the edges of each of the content groups 26, 36 and 42 defines the outer edges of the viewing range for each of the content groups. As can be seen the viewing range changes depending upon the angle with respect to the lenticule 74. As a result the range for images from lenticule 74 from view point 20 is a larger range than the range for the group 22 for view point 20 and it is thus necessary to restrict the viewing range to the minimum viewing range provided for each view point which will be the view point directly over the center image group aligned with the view point. In this example, the minimum viewing range for viewpoint 40 is defined by group 42 and lenticule 74.

Figures 5, 6:
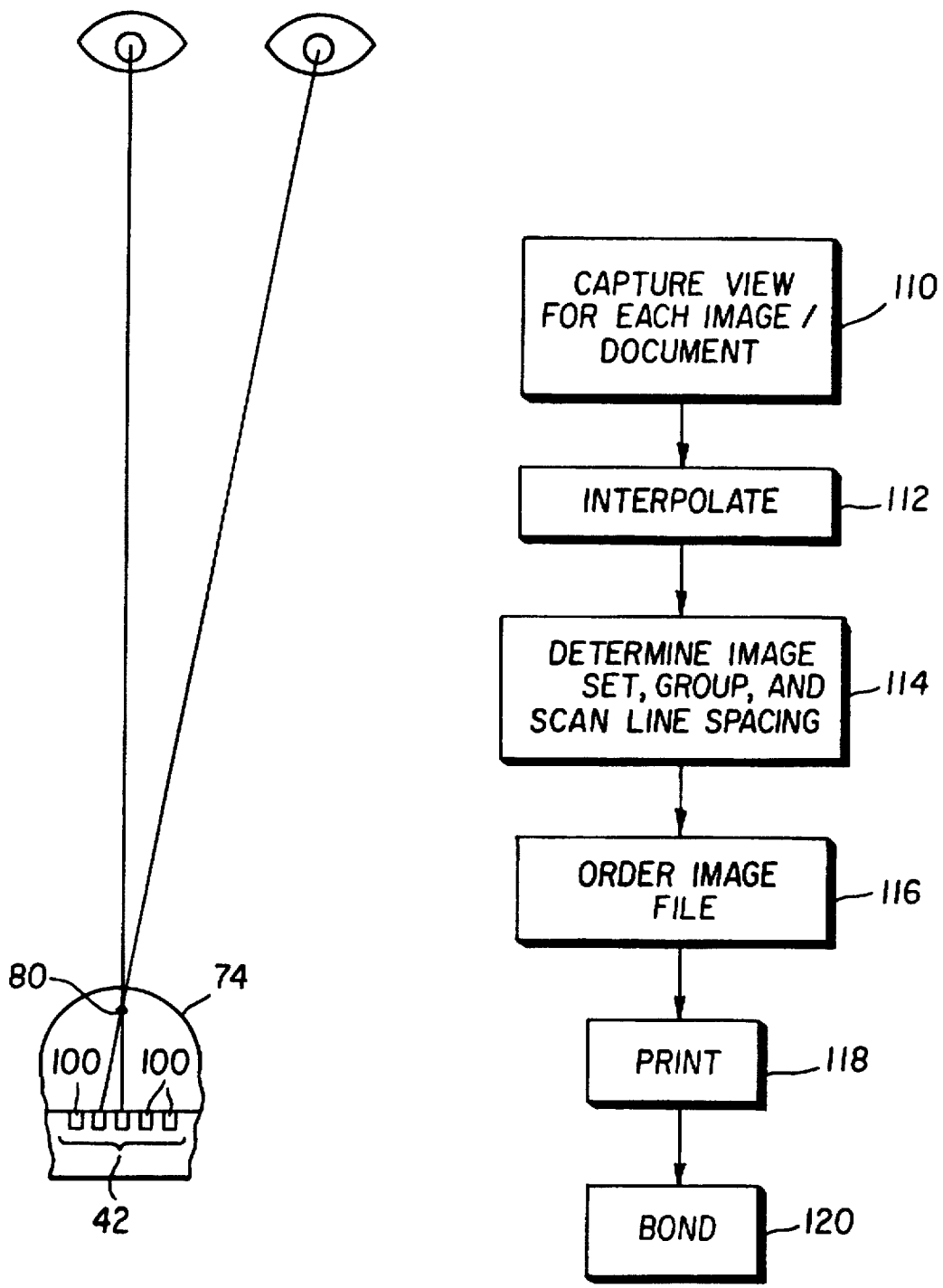
FIG. 5 illustrates in more detail the arrangement of different images of the same content within a group of images for a view.
FIG. 6 illustrates the process of producing a compound document as illustrated in FIG. 1.

FIG. 5 illustrates five scan line images 100 associated with a particular content group 42 associated with lenticule 74. As can be seen the eyes of the viewer perceive different ones of the scan lines, thereby providing the viewer with a sense of depth if each of the scan lines is from a different perspective of originally captured scene. By providing multiple scan lines for each group such as five as illustrated in FIG. 5, as the viewers eyes move slightly with respect to the designated view point such as view point 40 different scan lines will be presented by each lenticule from a slightly different perspective, thereby preserving the stereoscopic or depth image effect and allowing the viewer a limited "look around" capability with respect to the content being viewed at each view point. That is, if the text from one position is describing a scene such as the Grand Canyon when the viewer looks at the Grand Canyon image from the view point designed for that content, the depth image or three-dimensional image of the Grand Canyon will be perceived even when the viewer moves his head slightly. It should be noted that the scan line spacing associated with each of the lenticular scan lines 100 is adjusted with a different spacing therebetween depending upon the viewing angle for that particular lenticule. This scan line spacing adjustment is described in the related applications previously mentioned.

FIG. 6 illustrates the procedure used to create compound documents. The first step 110 is to capture the views for each depth image which will be presented within the compound document. As previously mentioned this capture and storage of the particular depth images is performed in accordance with the procedures discussed in the related applications. If only two images are captured and additional images need to be created to provide a range of head motion about each view point the captured images can be interpolated 112 to create new images as described in the related applications. Once the depth images themselves are created the desired view points are used to determine 114 the set spacing for each lenticule, the image content group spacing or the spacing between groups and the order of that spacing, and the scan line spacing within each image group using the procedure discussed in the related applications. Once the spacing of the image lines is determined the print file for printing the scan lines with the spacings desired is created 116 by sorting the scan lines with included spacing or positions into the order that they will be printed onto the emulsion. This ordering or interleaving is also discussed in the related applications. The system then prints 118 the print file and the lenticular screen is bonded 120 to the printed output.

Because the content groups from the same view point have different viewing ranges as illustrated in FIG. 4 it is important for the viewers to be reminded to keep their eyes within the appropriate viewing range. To help provide this and to help distinguish or alert the viewer that the viewer is changing content images as the viewer moves, with respect to the compound document or display 8, between the content groups, an image demarcation line, such as a brightly colored line for example bright blue or bright green, can be provided. This line will flash a bright color at the viewer in the form of having the viewer perceive that the entire compound document has turned blue as the viewer moves from view point to view point. As the viewer moves past the edge of the acceptable viewing range the color will appear as colored lines within the image detracting from the viewability of the image, thereby encouraging the viewer to move back to the acceptable range. This demarcation line is created by filling in the intergroup gap, such as gap 66 in FIG. 3, with the desired color. For example, if the intergap color is to be blue, the space between image groups for each set and the medium is a positive film emulsion, blue light is used to expose the scan lines in the gap.

The present invention has been described with respect to having a content group viewable from different view points such that all of the images presented to the viewer at that view point are of the same content. It is possible for that particular view point to create "ghost" images viewable within the content for that view point. For example, in text of a menu describing hamburgers, it is possible to present a ghost image that appears overlayed or mixed in with the scan lines for each content group. Of course this could be a depth image allowing depth ghost images within depth primary images. The spacings between or displacements of sets, content groups and scan lines has been described as continuously variable across the document responsive to the view point. It is possible to determine a compromise constant spacing which works well for all the desired view points and use that to fix the particular positions of the scan lines. The description has emphasized that the images from different view points are depth images. However, it is of course possible for one or more of the images to be non depth images. The description also indicates that the spacing of the groups, etc. is determined each time a compound document is produced. It is possible, and of course preferable in production line situations, to standardize the capture criteria for the images and produce a map that designates where each scan line for a standard compound document is to be positioned on the substrate. It is also possible to print the images on the back surface of a lenticular sheet.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A compound document display comprising:
   a lenticular depth image screen; and
   an image recording substrate confronting said depth image screen, said image recording substrate recording at least two depth images, at least one of said depth images presenting textual, content graphical image content, object image content, and scenic image content and at least one other of said depth images presenting a different one of textual content, graphical image content, object image content, and scenic image content;
      wherein said image recording substrate records the depth images in content groups, each content group having at least two images from different perspectives
      the compound document further comprising a ghost image scan positioned in content groups with a same content.

2. A display as recited in claim 1, wherein said image recording substrate is planar.

3. A display as recited in claim 1, wherein said image recording substrate records image break scan lines between said content groups.

4. A display as recited in claim 1, wherein said content groups across said image recording substrate have different spacings therebetween.

5. A display as recited in claim 1, wherein said content groups across said image recording substrate have different displacements relative to corresponding lenticules of said lenticular screen.

6. A display as recited in claim 1, wherein lenticular sets have different displacements relative to the corresponding lenticules.

7. A compound document display, comprising:

a depth image screen; and an image recording substrate confronting said depth image screen, said image recording substrate recording at least two depth images, at least one of said depth images presenting textual content in a first language and at least one of said depth images presenting textual content in a second language.

* * * * *